United States Patent
Liu et al.

(10) Patent No.: US 12,403,625 B1
(45) Date of Patent: Sep. 2, 2025

(54) METHOD FOR MANUFACTURING SILICON CARBIDE CERAMIC SPECIAL-SHAPED PART WITH COMPLEX SHAPE BY PLASTIC FUSED DEPOSITION MODELING (FDM)-3D PRINTING BASED ON WATER DEBINDING

(71) Applicant: Dongguan University of Technology, Guangdong (CN)

(72) Inventors: Wei Liu, Guangdong (CN); Muqi Luo, Guangdong (CN); Qi Zeng, Guangdong (CN); Geng Hou, Guangdong (CN)

(73) Assignee: Dongguan University of Technology, Dongguan (CN)

( * ) Notice: Subject to any disclaimer, the term of this patent is extended or adjusted under 35 U.S.C. 154(b) by 0 days.

(21) Appl. No.: 19/027,370

(22) Filed: Jan. 17, 2025

(30) Foreign Application Priority Data

Nov. 19, 2024 (CN) .......................... 202411658211.4

(51) Int. Cl.
*B28B 1/00* (2006.01)
*B28B 3/22* (2006.01)
*C04B 35/565* (2006.01)
*C04B 35/628* (2006.01)

(52) U.S. Cl.
CPC ................ *B28B 1/001* (2013.01); *B28B 3/22* (2013.01); *C04B 35/565* (2013.01); *C04B 35/62886* (2013.01); *C04B 2235/3826* (2013.01); *C04B 2235/424* (2013.01); *C04B 2235/425* (2013.01); *C04B 2235/48* (2013.01); *C04B 2235/6567* (2013.01); *C04B 2235/6581* (2013.01)

(58) Field of Classification Search
CPC ....................................................... B28B 1/001
See application file for complete search history.

(56) References Cited

U.S. PATENT DOCUMENTS

2018/0154437 A1 * 6/2018 Mark ..................... B33Y 10/00
2018/0154439 A1 * 6/2018 Mark ....................... B22F 5/10
2018/0154574 A1 * 6/2018 Mark ....................... B22F 1/10
(Continued)

FOREIGN PATENT DOCUMENTS

CN 118561598 A * 8/2024
DE 102013004182 A1 * 9/2014 ............ B22F 1/0059

OTHER PUBLICATIONS

English machine translation of DE-102013004182-A1, retrieved from USPTO database Apr. 3, 2025 (Year: 2025).*
(Continued)

*Primary Examiner* — Timothy Kennedy
(74) *Attorney, Agent, or Firm* — WCF IP (57) ABSTRACT

Disclosed is a method for manufacturing a silicon carbide ceramic special-shaped part with a complex shape by plastic fused deposition modeling (FDM)-3D printing based on water debinding. The method includes: mixing graphite, carbon black, silicon carbide, and a surface modifier, and subjecting a resulting mixture to modification to obtain a surface modifier-coated composite ceramic powder; subjecting the surface modifier-coated composite ceramic powder with a macromolecular binder to internal mixing with an internal mixer to obtain a ceramic 3D printing feed; and subjecting the ceramic 3D printing feed to 3D printing, debinding, and reaction sintering in sequence to obtain the silicon carbide ceramic special-shaped part with the complex shape.

12 Claims, 2 Drawing Sheets

(56) References Cited

U.S. PATENT DOCUMENTS

| | | | |
|---|---|---|---|
| 2018/0154580 A1* | 6/2018 | Mark | B22F 3/24 |
| 2018/0162062 A1* | 6/2018 | Mark | B22F 10/47 |
| 2019/0022928 A1* | 1/2019 | Bartow | B33Y 80/00 |
| 2019/0255612 A1* | 8/2019 | Mark | B29C 64/295 |
| 2019/0270254 A1* | 9/2019 | Mark | B29C 64/118 |
| 2021/0179498 A1* | 6/2021 | Katsikis | C04B 35/565 |
| 2024/0308155 A1* | 9/2024 | Da Lima | C04B 35/52 |

OTHER PUBLICATIONS

English machine translation of CN-118561598-A, retrieved from USPTO database Apr. 3, 2025 (Year: 2025).*

* cited by examiner

METHOD FOR MANUFACTURING SILICON CARBIDE CERAMIC SPECIAL-SHAPED PART WITH COMPLEX SHAPE BY PLASTIC FUSED DEPOSITION MODELING (FDM)-3D PRINTING BASED ON WATER DEBINDING

CROSS REFERENCE TO RELATED APPLICATION

This patent application claims the benefit and priority of Chinese Patent Application No. 2024116582114 filed with the China National Intellectual Property Administration on Nov. 19, 2024, and entitled with "METHOD FOR MANUFACTURING SILICON CARBIDE CERAMIC SPECIAL-SHAPED PART WITH COMPLEX SHAPE BY PLASTIC FUSED DEPOSITION MODELING (FDM)-3D PRINTING BASED ON WATER DEBINDING", the disclosure of which is incorporated by reference herein in its entirety as part of the present application.

TECHNICAL FIELD

The present disclosure relates to the technical field of ceramic three-dimensional (3D) printing, and in particular relates to a method for manufacturing a silicon carbide ceramic special-shaped part with a complex shape by plastic fused deposition modeling (FDM)-3D printing based on water debinding.

BACKGROUND

As an additive manufacturing technology, 3D printing technology has obvious advantages over traditional equal material manufacturing technologies. 3D printing technology does not require mold opening, which greatly reduces mold opening costs and eliminates mold opening cycles. 3D printing is a net-size molding method that requires little or no post-processing compared to traditional methods. 3D printing is an intelligent manufacturing method that can achieve intelligent printing through computer modeling and slicing, and can also achieve printing details that are difficult to prepare using traditional methods, such as chip breakers, inner holes, and bends. The development of 3D printing can now also achieve multi-material printing.

The most essential difference between special ceramic materials with metals and polymer materials in processing is that ceramic materials are highly brittle and lack plasticity. At present, special materials that need to be molded can only use the idea of powder metallurgy, that is, mixing a ceramic powder with an organic binder to give ceramic plasticity, then pouring a resulting suspension after mixing both (which can be a liquid or molten solid) into a mold to allow forming, followed by removing the organic binder by debinding, and then conducting sintering to obtain a required sample. This type of powder metallurgy method has a long process route, is prone to defects during the debinding, and has high costs and a long cycle in post-processing. Such a method is suitable for the large-scale preparation of certain special ceramics, but is obviously inferior to 3D printing for advantages in small- and medium-scale applications. 3D printing of special ceramics mainly includes stereo lithography apparatus and digital light processing (SLA, DLP), selective laser sintering (SLS), binder jetting (BJ), fused deposition modeling (FDM), and 3D direct ink writing (DIW). FDM has become the most popular 3D printing method for special ceramics due to its simple equipment, simple printing logic and process, easy and precise control of printing (which can work with a robotic arm, allowing printing in an extremely large space), low cost, and no selectivity for material properties (for example, the SLA is selective for the optical properties of powder materials).

Figure 1A:
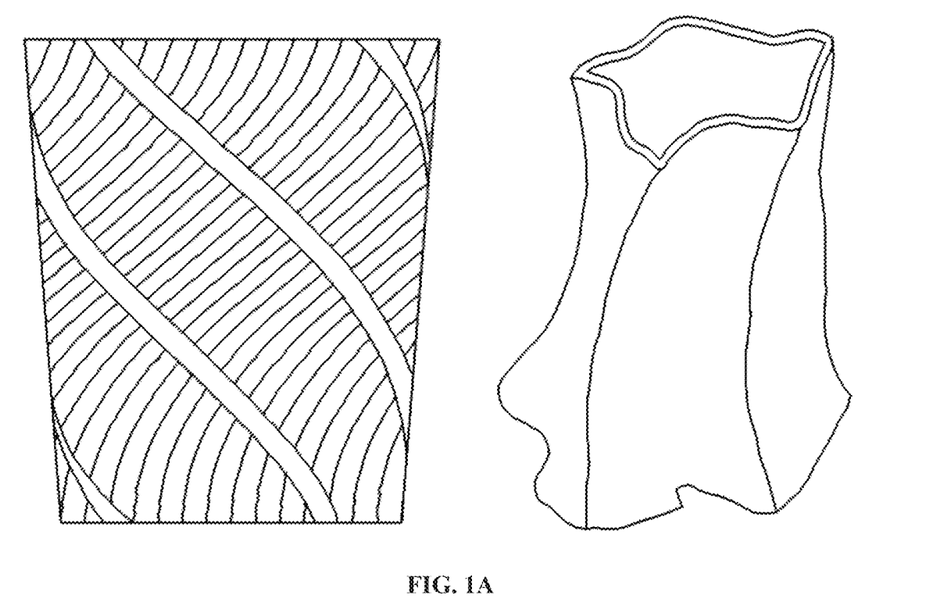

However, existing FDM generally adopts small-molecule binders (with low molecular weight, low melting temperature, poor plasticity, poor strength, and low precision, which are usually soluble in solvents, and have very obvious interlayer defects in printed samples) and cannot meet the requirements of researchers and engineers for 3D printing. A typical sample manufactured by traditional FDM using a small-molecule binder system is shown in FIG. 1A.

SUMMARY

An object of the present disclosure is to provide a method for manufacturing a silicon carbide ceramic special-shaped part with a complex shape by plastic FDM-3D printing based on water debinding. In the present disclosure, the silicon carbide ceramic special-shaped part with a complex shape obtained by the method has a high sintered body density (not less than 2.9 $g/cm^3$), a high sintered body strength (350 MPa±32 MPa), a high sintered body purity (not less than 99.5%, excluding free Si), and a high sintered body precision (about 100 μm to 200 μm). In addition, the method uses an environmentally friendly water solvent to allow debinding, and by optimizing the formula system of a water debinding binder, the debinding rate reaches not less than 90%, and the two-step thermal debinding stage can be skipped to conduct sintering directly.

To achieve the above object, the present disclosure provides the following technical solutions:

The present disclosure provides a method for manufacturing a silicon carbide ceramic special-shaped part with a complex shape by plastic FDM-3D printing based on water debinding, including: mixing graphite, carbon black, silicon carbide, and a surface modifier, and subjecting a resulting mixture to modification to obtain a surface modifier-coated composite ceramic powder;

subjecting the surface modifier-coated composite ceramic powder, a macromolecular binder and a water-soluble binder to internal mixing, and then subjecting a resulting mixed material to crushing or granulation to obtain a ceramic 3D printing feed, where the macromolecular binder includes a high-strength engineering plastic, a high-toughness engineering plastic, and a thermoplastic elastomer, and the water-soluble binder includes a polyethylene glycol (PEG); the high-strength engineering plastic has a bending strength greater than or equal to 50 MPa, the high-toughness engineering plastic has a fracture toughness greater than or equal to 50 MPa·$m^{1/2}$, and the PEG includes a high-molecular-weight PEG and a low-molecular-weight PEG; and the low-molecular-weight PEG has a weight-average molecular weight less than or equal to 1,000, and the high-molecular-weight PEG has a weight-average molecular weight greater than 1,000; and subjecting the ceramic 3D printing feed to plastic FDM-3D printing, water debinding, and reaction sintering in sequence to obtain the silicon carbide ceramic special-shaped part with the complex shape.

In some embodiments, a mass ratio of the graphite, the carbon black, and the silicon carbide is in a range of (5-7):(1-2):100.

In some embodiments, the surface modifier includes one or more selected from the group consisting of a fatty acid surface modifier, and a coupling agent surface modifier; the fatty acid surface modifier includes one or more selected from the group consisting of stearic acid, oleic acid, and dodecyl stearic acid; and the coupling agent surface modifier includes one or more selected from the group consisting of a silane coupling agent, a titanate coupling agent, and an aluminate coupling agent; and a ratio of a mass of the surface modifier to a total mass of the graphite, the carbon black, and the silicon carbide is in a range of 0.5:100 to 3:100.

In some embodiments, the modification is conducted under a condition of ball milling, and the ball milling is conducted by wet high-energy ball milling; and the ball milling is conducted at a rotate speed of 500 rpm to 700 rpm with alcohol as a medium under a ball-to-material mass ratio of 2:1 to 3:1 for 12 h to 24 h, and the ball milling is conducted by using a zirconium oxide microbead as a grinding ball.

In some embodiments, a ratio of a mass of the surface modifier-coated composite ceramic powder to a total mass of the macromolecular binder and the water-soluble binder is in a range of 4.6:1 to 8:1; and a mass ratio of the high-strength engineering plastic, the high-toughness engineering plastic, the PEG, and the thermoplastic elastomer is in a range of (15-20):(15-20):(50-60):(5-10).

In some embodiments, the high-molecular-weight PEG includes one or more selected from the group consisting of PEG2000 and PEG6000; and the low-molecular-weight PEG includes one or more selected from the group consisting of PEG500 and PEG800; and a mass ratio of the low-molecular-weight PEG to the high-molecular-weight PEG is in a range of 1:1 to 4:1.

In some embodiments, the internal mixing is conducted in an internal mixer at a temperature of 170° C. to 190° C. for 1 h to 2 h.

In some embodiments, the plastic FDM-3D printing is conducted by a high-precision screw extrusion FDM printer; and the plastic FDM-3D printing is conducted under the following conditions: an extrusion pressure of 10 MPa to 40 MPa, and temperatures from a feed port to a nozzle of the high-precision screw extrusion FDM printer are 160° C., 170° C., 180° C., and 190° C. in sequence.

In some embodiments, the water debinding is conducted at a temperature of 40° C. to 60° C. for 72 h to 120 h.

In some embodiments, the reaction sintering is conducted at a temperature of 2,100° C. to 2,250° C. under a vacuum degree less than or equal to 10 Pa, and the reaction sintering is held at the temperature for 3 h to 7 h.

The present disclosure provides a method for manufacturing a silicon carbide ceramic special-shaped part with a complex shape by plastic FDM-3D printing based on water debinding, including: mixing graphite, carbon black, silicon carbide, and a surface modifier, and subjecting a resulting mixture to modification to obtain a surface modifier-coated composite ceramic powder; subjecting the surface modifier-coated composite ceramic powder, a macromolecular binder and a water-soluble binder to internal mixing, and then subjecting a resulting mixed material to crushing or granulation to obtain a ceramic 3D printing feed, where the macromolecular binder includes a high-strength engineering plastic, a high-toughness engineering plastic, and a thermoplastic elastomer, and the water-soluble binder includes a polyethylene glycol (PEG); the high-strength engineering plastic has a bending strength greater than or equal to 50 MPa, the high-toughness engineering plastic has a fracture toughness greater than or equal to 50 MPa·m$^{1/2}$, and the PEG includes a high-molecular-weight PEG and a low-molecular-weight PEG; and the low-molecular-weight PEG has a weight-average molecular weight less than or equal to 1,000, and the high-molecular-weight PEG has a weight-average molecular weight greater than 1,000; and subjecting the ceramic 3D printing feed to plastic FDM-3D printing, water debinding, and reaction sintering in sequence to obtain the silicon carbide ceramic special-shaped part with the complex shape.

Figure 1B:
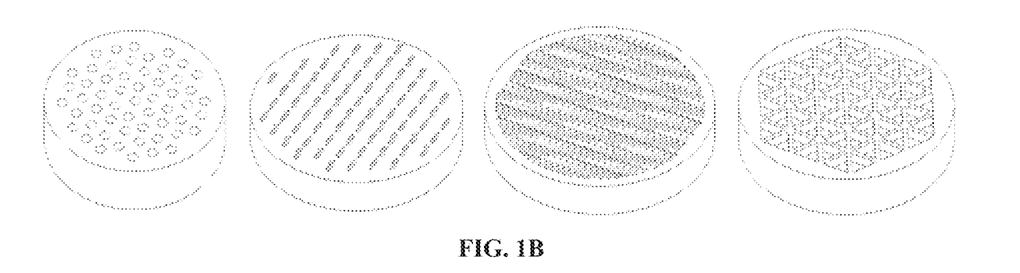

Compared with the prior art, some embodiments of the present disclosure have the following technical effects:

In the present disclosure, the macromolecular binder is used and the high-strength engineering plastic, high-toughness engineering plastic, and thermoplastic elastomer are used as the skeleton binder. The engineering plastics have strong plasticity and high melting temperature (170° C. to 190° C.) and are normally insoluble in organic solvents. An injection body blank has extremely high precision (several microns) and high strength (ten to several tens of MPa). Plastic FDM-3D printing is adopted (an injection molding nozzle is changed into a movable nozzle, which is developed into 3D printing, namely the plastic FDM-3D printing). Compared with the traditional 3D printing method using small-molecule binders, an injection molding formula provided by the present disclosure is used for 3D printing, and a macromolecular binder (skeleton binder, namely an engineering plastic) is added to the components, which gives the printing feed the desired plasticity, precision, and strength. The method provided by the present disclosure has absolute advantages over traditional FDM, such as high body strength, high precision, and high density, no obvious interlayer interface defects, and strong plasticity; in addition, larger parts (such as ceramic parts with a diameter of 1 m) can be printed, as shown in FIG. 1B. FIG. 1A schematically shows the typical sample manufactured by conventional FDM using a small-molecule binder system. It can be seen from in FIG. 1A that the sample is easy to break, the defect traces of the interlayer interface are extremely obvious, and only simple-shaped samples are printed. FIG. 1B schematically shows the typical sample manufactured by the plastic FDM-3D printing method based on water debinding provided by the present disclosure. It can be seen from FIG. 1B that this method can prepare samples with more complex shapes, unclear interlayer interface, and no obvious defects.

Further, silicon carbide structural ceramic components are prepared by the plastic FDM-3D printing method in the present disclosure. The method can be used to prepare silicon carbide mirrors for space satellites, silicon carbide foam ceramic filters for filtering and limiting the flow of Fe in the casting field, photovoltaic ceramic boats, and semiconductor ceramic boats, and so on. After reaction sintering, the above products have a high density (not less than 2.9 g/cm$^3$), a high strength (395 MPa±32 MPa), a high purity (not less than 99%, excluding free Si), and a high precision (about 100 μm to 200 μm), making the method an extremely optimized solution for 3D printing of silicon carbide ceramics.

In the method of the present disclosure, the defects caused by the water debinding are mainly avoided through two ways. (1) The performance of engineering plastics in the macromolecular binder is improved: high-strength and high-toughness engineering plastics are used for compounding, such that the printed blank has both the desired strength and toughness. Such a printed blank has stronger resistance to defects when immersed in water. (2) The performance of water-soluble binder is improved: the occurrence of defects can be further solved by compounding high- and lowmolecular-weight PEGs. The principle is that during water solvent debinding, the low-molecular-weight PEG is removed into water, leaving a large number of pore channels for the body blank, and then the high-molecular-weight PEG is removed along the channels left by the low-molecular-weight PEG, effectively avoiding the occurrence of defects. The method without PEG compounding is very prone to defects.

In the present disclosure, environmentally friendly, low-cost, and non-flammable water is used as a solvent for debinding. After optimizing the binder formula for water debinding (the macromolecular binder includes the high-strength engineering plastic, high-toughness engineering plastic, and thermoplastic elastomer), the body blank does not have any defects after being immersed in water for about 3 d to 5 d (such as bubbles and cracks, while the traditional water debinding formulas are generally prone to defects after more than 8 h), and the debinding rate exceeds 90%. In this method, due to the extremely high debinding rate, the two-step thermal debinding can be omitted to conduct sintering directly.

Further, the surface modifier includes one or more selected from the group consisting of a fatty acid surface modifier and a coupling agent surface modifier; the fatty acid surface modifier includes one or more selected from the group consisting of stearic acid, oleic acid, and dodecyl stearic acid; and the coupling agent surface modifier includes one or more selected from the group consisting of a silane coupling agent, a titanate coupling agent, and an aluminate coupling agent. The fatty acid surface modifier can undergo esterification with the composite ceramic powder (graphite, carbon black, and silicon carbide) and be coated on a surface of the ceramic powder, such that the ceramic powder (graphite, carbon black, and silicon carbide) and the macromolecular binder in the internal mixing can achieve better infiltration. The coupling agent surface modifier can undergo ester exchange with the ceramic powder (graphite, carbon black, and silicon carbide) and be coated on the surface of the ceramic powder (graphite, carbon black, and silicon carbide), and can also achieve better infiltration between the ceramic powder and the macromolecular binder in the internal mixing. In the present disclosure, a surface modifier coating layer in the surface modifier-coated ceramic powder has a thickness of preferably 0.5 nm to 4 nm.

Further, the modification is conducted under a condition of ball milling, and the ball milling is conducted by a wet high-energy ball milling; and the ball milling is conducted at a rotate speed of 500 rpm to 700 rpm. The modification is achieved by wet high-energy ball milling, and the ball milling is conducted at a relatively high speed (500 rpm to 700 rpm) in a ball mill, such that the surface modifier can be adhered and coated on the ceramic powder.

Figure 2A:
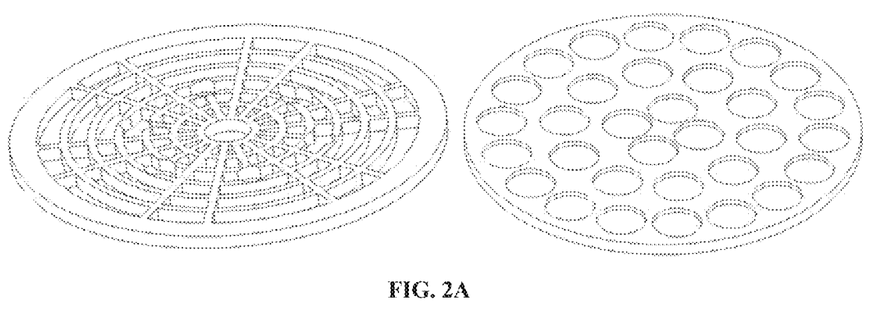
FIG. 2A to FIG. 2B schematically show the silicon carbide ceramic special-shaped parts with a typically complex shape prepared by plastic FDM-3D printing based on water debinding prepared in an example, where the mode of the sintering is reaction sintering.
Figure 2B:
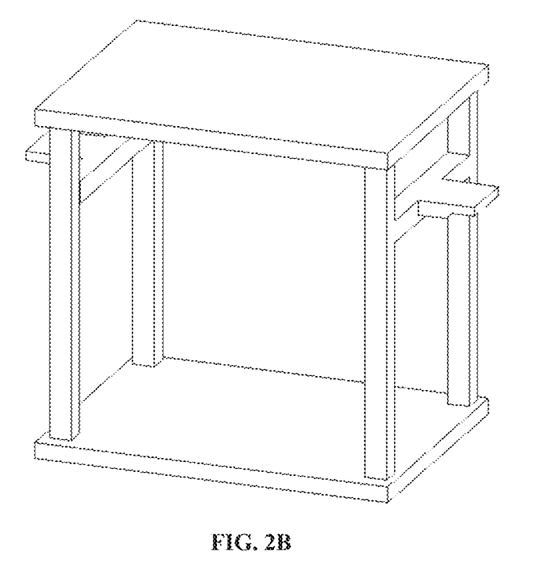

In summary, the silicon carbide ceramic special-shaped part with a complex shape obtained by the method provided by the present disclosure has a high sintered body density (not less than 2.9 g/cm$^3$), a high sintered body strength (350 MPa±32 MPa), a high sintered body purity (not less than 99%, excluding free Si), and a high sintered body precision (about 100 μm to 200 μm). Environmentally friendly water debinding is conducted while the binder formula system is optimized (using high-strength and high-toughness engineering plastics for compounding; compounding by high- and low-molecular-weight hydrophilic PEG), which avoids the defects caused by long-term debinding. The sample has no defects after being immersed in water solvent for about 72 h to 120 h, the debinding rate is as high as not less than 90%, and the two-step thermal debinding can be omitted to conduct sintering directly. The large-sized silicon carbide ceramic components with a typical complex shape prepared by the method of the present disclosure are shown in FIG. 2A to FIG. 2B. FIG. 2A to FIG. 2B schematically show the silicon carbide ceramic special-shaped parts with a typical complex shape prepared by the plastic FDM-3D printing based on water debinding, where the mode of the sintering is reaction sintering; FIG. 2A schematically shows the silicon carbide mirror for space use (a white inlaid material in the figure is the deposition of free Si in the reaction sintering, and can be removed by sandblasting later), and FIG. 2B schematically shows the silicon carbide boat for photovoltaic field.

BRIEF DESCRIPTION OF THE DRAWINGS

FIG. 1A to FIG. 1B show schematic diagrams of the typical samples prepared by different methods; where FIG. 1A schematically shows the typical sample manufactured by traditional FDM using a small-molecule binder system; and FIG. 1B schematically shows the typical sample manufactured by the plastic FDM-3D printing based on water debinding.

DETAILED DESCRIPTION OF THE EMBODIMENTS

The present disclosure provides a method for manufacturing a silicon carbide ceramic special-shaped part with a complex shape by plastic FDM-3D printing based on water debinding, including the following steps:
  mixing graphite, carbon black, silicon carbide, and a surface modifier, and subjecting a resulting mixture to modification to obtain a surface modifier-coated composite ceramic powder;
  subjecting the surface modifier-coated composite ceramic powder, a macromolecular binder and a water-soluble binder to internal mixing, and then subjecting a resulting mixed material to crushing or granulation to obtain a ceramic 3D printing feed, where the macromolecular binder includes a high-strength engineering plastic, a high-toughness engineering plastic, and a thermoplastic elastomer, and the water-soluble binder includes a polyethylene glycol (PEG); the high-strength engineering plastic has a bending strength greater than or equal to 50 MPa, the high-toughness engineering plastic has a fracture toughness greater than or equal to 50 MPa·m$^{1/2}$, and the PEG includes a high-molecular-weight PEG and a low-molecular-weight PEG; and the low-molecular-weight PEG has a weight-average molecular weight less than or equal to 1,000, and the high-molecular-weight PEG has a weight-average molecular weight greater than 1,000; and
  subjecting the ceramic 3D printing feed to plastic FDM-3D printing, water debinding, and reaction sintering in sequence to obtain the silicon carbide ceramic special-shaped part with the complex shape.

In the present disclosure, unless otherwise specified, all raw materials for preparation are commercially available products well known to those skilled in the art.

In the present disclosure, graphite, carbon black, silicon carbide and a surface modifier are mixed, and a resulting mixture is subjected to modification to obtain a surface modifier-coated composite ceramic powder. In some embodiments of the present disclosure, the silicon carbide has a purity greater than or equal to 99.5%, and the silicon carbide has a particle size of sub-micron level. There is no special limitation on the graphite and carbon black, and graphite and carbon black well known to those skilled in the art may be used. In some embodiments of the present disclosure, a mass ratio of the graphite, the carbon black, and the silicon carbide is in a range of (5-7):(1-2):100, and preferably (6-6.5):(1.5-2):100. In some embodiments of the present disclosure, the surface modifier includes one or more selected from the group consisting of a fatty acid surface modifier and a coupling agent surface modifier; the fatty acid surface modifier includes one or more selected from the group consisting of stearic acid, oleic acid, and dodecyl stearic acid; and the coupling agent surface modifier includes one or more selected from the group consisting of a silane coupling agent, a titanate coupling agent, and an aluminate coupling agent. In some embodiments of the present disclosure, the surface modifier includes the oleic acid, silane coupling agent, stearic acid, or titanate coupling agent. In some embodiments of the present disclosure, a ratio of a mass of the surface modifier to a total mass of the graphite, the carbon black, and the silicon carbide is in a range of (0.5-3):100, and preferably (1.5-3):100.

In some embodiments of the present disclosure, the modification is conducted under a condition of ball milling, and the ball milling is conducted by wet high-energy ball milling. In some embodiments of the present disclosure, the ball milling is conducted at a rotate speed of 500 rpm to 700 rpm, the ball milling is conducted with alcohol as a medium, the ball milling is conducted under a ball-to-material mass ratio of 2:1 to 3:1, the ball milling is conducted for 12 h to 24 h, and the ball milling is conducted by using a zirconium oxide microbead as a grinding ball.

In some embodiments of the present disclosure, the ball milling is conducted at 300 rpm with alcohol having a volume concentration of 50% to 75% as a medium under a ball-to-material mass ratio of 2:1 to 3:1 for 12 h to 24 h, and the ball milling is conducted by using a zirconium oxide microbead as a grinding ball.

In some embodiments of the present disclosure, a surface modifier coating layer in the surface modifier-coated ceramic powder has a thickness of 0.5 nm to 4 nm, and preferably 1.5 nm to 2.5 nm.

In the present disclosure, esterification or ester exchange occurs between the surface modifier and the ceramic powder during the ball milling. The effect of the graphite/carbon black is to provide a carbon source during the reaction sintering of silicon carbide, such that the carbon can react with free Si in the atmosphere to form silicon carbide. The effect of the surface modifier as a coating layer is to increase the mass proportion of the composite ceramic powder in the subsequent ceramic 3D printing feed. The higher the mass proportion of the composite ceramic powder, the higher the density of the green body, and the higher the density of the ceramic sintering. Meanwhile, the modification can also enhance the wettability, improve the uniformity of the mixture, and make the subsequent internal mixing smoother. The process of the modification is different from the traditional injection molding that introduces surface modifiers during the mixing stage. The main advantage is that the surface modifier is introduced into the powder system before internal mixing, and the surface modifier is induced by high-energy spheroidal graphite to form a coating layer on the surface of the ceramic powder, such that the surface modifier can be arranged more regularly on powder particles. However, if the surface modifier is introduced during the internal mixing, the surface modifier is randomly and messily distributed, and does not have the effect of pre-modification.

In the present disclosure, after obtaining the surface modifier-coated composite ceramic powder, the surface modifier-coated composite ceramic powder, a macromolecular binder and a water-soluble binder are subjected to internal mixing, and then a resulting mixed material is subjected to crushing or granulation to obtain a ceramic 3D printing feed, where the macromolecular binder includes a high-strength engineering plastic, a high-toughness engineering plastic, and a thermoplastic elastomer, and the water-soluble binder includes a polyethylene glycol (PEG); the high-strength engineering plastic has a bending strength greater than or equal to 50 MPa, the high-toughness engineering plastic has a fracture toughness greater than or equal to 50 MPa·m$^{1/2}$, and the PEG includes a high-molecular-weight PEG and a low-molecular-weight PEG; and the low-molecular-weight PEG has a weight-average molecular weight less than or equal to 1,000, and the high-molecular-weight PEG has a weight-average molecular weight greater than 1,000. In some embodiments of the present disclosure, the high-strength engineering plastic is high-strength high density polyethylene (HDPE) or high-strength polypropylene (PP). In some embodiments of the present disclosure, the high-toughness engineering plastic is high-toughness HDPE or high-toughness low density polyethylene (LDPE).

In some embodiments of the present disclosure, a bending strength of the high-strength engineering plastic is a bending strength of a pure injection molded part of an engineering plastic. In some embodiments of the present disclosure, the high-molecular-weight PEG includes one or more selected from the group consisting of PEG2000 and PEG6000. In some embodiments of the present disclosure, the low-molecular-weight PEG includes one or more selected from the group consisting of PEG500 and PEG800. In some embodiments of the present disclosure, a mass ratio of the low-molecular-weight PEG to the high-molecular-weight PEG is in a range of 1:1 to 4:1, and preferably 3:1 or 4:1. In some embodiments of the present disclosure, the thermoplastic elastomer includes one or more selected from the group consisting of ethylene-vinyl acetate copolymer (EVA) and maleic anhydride-grafted polyolefin elastomer (POE).

In some embodiments of the present disclosure, a mass ratio of the high-strength engineering plastic, the high-toughness engineering plastic, the PEG, and the thermoplastic elastomer is in a range of (15-20):(15-20):(50-60):(5-10), and preferably (17-19):(17-19):(55-57):(6-8).

In some embodiments of the present disclosure, a ratio of a mass of the surface modifier-coated composite ceramic powder to a total mass of the macromolecular binder and the water-soluble binder is in a range of 4.6:1 to 8:1, preferably 5:1 to 7.5:1, and more preferably 5.2:1, 6.25:1, 7.4:1, or 6.29:1.

In some embodiments of the present disclosure, the internal mixing is conducted in an internal mixer at a temperature of 170° C. to 190° C., and the internal mixing is conducted for 1 h to 2 h.

In some embodiments of the present disclosure, the internal mixing is conducted by a process including: preheating a ceramic internal mixer until a temperature of a cone reaches 170° C. to 190° C., adding 50 wt % of the surface modifier-coated ceramic powder, and then adding all the macromolecular binder and the water-soluble binder; and after 50 wt % of the surface modifier-coated ceramic powder, the macromolecular binder and the water-soluble binder are completely melted together, adding the remaining surface modifier-coated ceramic powder.

In the present disclosure, a resulting mixed material is obtained after the internal mixing is completed, and the resulting mixed material is subjected to crushing or granulation. There is no special limitation on the crushing or granulation process, and the process well known to those skilled in the art may be used.

In the present disclosure, in the ceramic 3D printing feed: the engineering plastic in the macromolecular binder (i.e., high-strength engineering plastic and high-toughness engineering plastic in the examples) is used as a skeleton binder, provides sufficient plasticity and strength, and has a supporting effect on the printed blank; the small-molecule binder (PEG) and the surface modifier in the water-soluble binder together give the ceramic feed fluidity, while improving the wettability and compatibility of the powder with the engineering plastic in the macromolecular binder. In the present disclosure, the macromolecular binder gives strong plasticity, strength, density, and printing accuracy to the ceramic printing material. In this way, various ceramic special-shaped parts with different complex shapes can be printed.

In some embodiments of the present disclosure, after obtaining the ceramic 3D printing feed, the ceramic 3D printing feed is subjected to plastic FDM-3D printing, water debinding, and reaction sintering in sequence to obtain the silicon carbide ceramic special-shaped part with a complex shape. In some embodiments of the present disclosure, the plastic FDM-3D printing is conducted by a high-precision screw extrusion FDM printer; and the plastic FDM-3D printing is conducted under the following conditions: an extrusion pressure of 10 MPa to 40 MPa, and temperatures from a feed port to a nozzle of the high-precision screw extrusion FDM printer are 160° C., 170° C., 180° C., and 190° C. in sequence.

In some embodiments of the present disclosure, the water debinding is conducted at a temperature of 40° C. to 60° C., and preferably 45° C. to 55° C., the water debinding is conducted for 72 h to 120 h, and preferably 72 h to 100 h, and the water debinding is conducted under a condition of water bath. In the present disclosure, the advantage of the water debinding process is that only water is used as a solvent for debinding, which is almost cost-free compared to organic solvent debinding; and water debinding is more environmentally friendly and safer (non-flammable) than the organic solvent debinding.

In some embodiments of the present disclosure, the reaction sintering is conducted at a temperature of 2,100° C. to 2,250° C., the reaction sintering is held at the temperature for 3 h to 7 h, and preferably 3 h to 5 h, and the reaction sintering is conducted under a vacuum degree less than or equal to 10 Pa, and preferably 2 Pa to 9 Pa. In some embodiments of the present disclosure, the reaction sintering is conducted by a process including: covering a bottom layer of a vacuum sintering furnace with a silicon powder, during the sintering process, Si can become gaseous Si, and then allowing the gaseous Si to react with C in a workpiece after debinding to form reaction sintered SiC, such that a density of the reaction sintered silicon carbide reaches not less than 2.9 g/cm$^3$.

In the present disclosure, the effect of the reaction sintering is to generate reaction sintered SiC by initiating a reaction between free Si and a carbon source in SiC to fill pores in the sintered body, thereby achieving densification.

The preparation method of the pan-semiconductor silicon carbide ceramic component provided by the present disclosure is described in detail below with reference to the examples, but these examples should not be construed as limiting the scope of the present disclosure.

Example 1

62 g of graphite, 17 g of carbon black, 1,000 g of silicon carbide (purity ≥99.5%), and 22 g of a surface modifier (the type was specifically oleic acid) were mixed, and subjected to ball milling with alcohol (having a volume concentration of 50 vol %) as a ball milling medium, where the ball milling was conducted by using zirconium oxide grinding balls as a grinding ball at 600 rpm for 15 h to obtain a surface modifier-coated ceramic powder (a surface modifier coating layer had a thickness of 1.5 nm).

A ceramic internal mixer was preheated until a temperature of a cone reached 180° C., 550.5 g of the surface modifier-coated ceramic powder was added to the mixer, and then 211.73 g of a binder system (including high-strength HDPE, high-toughness HDPE, PEG, and EVA at a mass ratio of 17:17:55:5, where the PEG was a compound of PEG500 and PEG6000 at a mass ratio of 3:1) was added thereto. After the surface modifier-coated ceramic powder and the binder system were completely melted together, 550.5 g of the surface modifier-coated ceramic powder was added thereto, and a resulting mixed material was crushed to obtain a ceramic 3D printing feed.

3D printing was conducted by a high-precision screw extrusion FDM printer (an extrusion pressure was 20 MPa, and temperatures from a screw feed port to a nozzle were 160° C., 170° C., 180° C., and 190° C. in sequence), followed by water solvent debinding (which was conducted at 50° C. for 72 h) and then reaction sintering (which was conducted at 2,170° C. for 4 h under a vacuum degree of 7 Pa) to obtain multiple silicon carbide foam ceramic filters with complex shapes for casting.

Example 2

130 g of graphite, 400 g of carbon black, 2,000 g of silicon carbide (purity ≥99.5%), and 48.7 g of a surface modifier (the type was specifically silane coupling agent) were mixed, and subjected to ball milling with alcohol (having a volume concentration of 72 vol %) as a ball milling medium, where the ball milling was conducted by using zirconium oxide grinding balls as a grinding ball at 700 rpm for 20 h to obtain a surface modifier-coated ceramic powder (a surface modifier coating layer had a thickness of 3 nm).

A ceramic internal mixer was preheated until a temperature of a cone reached 180° C., 1,289.35 g of the surface modifier-coated ceramic powder was added to the mixer, and then 412.592 g of a binder system (including high-strength PP, high-toughness HEPE, PEG, and EVA at a mass ratio of 18:19:57:8, where the PEG was a compound of PEG500 and PEG2000 at a mass ratio of 4:1) was added thereto. After the surface modifier-coated ceramic powder and the binder system were completely melted together, 1,289.35 g of the surface modifier-coated ceramic powder was added thereto, and a resulting mixed material was directly granulated to obtain a ceramic 3D printing feed.

3D printing was conducted by a 3D printing screw extrusion printer (an extrusion pressure was 35 MPa, and temperatures from a screw feed port to a nozzle were 160°

C., 170° C., 180° C., and 190° C. in sequence), followed by water solvent debinding (which was conducted at 48° C. for 3 d) and then reaction sintering (which was conducted at 2,200° C. for 5 h under a vacuum degree of 5 Pa) to obtain multiple small silicon carbide impellers.

Example 3

256 g of graphite, 76 g of carbon black, 4,000 g of silicon carbide (purity ≥99.5%), and 44 g of a surface modifier (the type was specifically stearic acid) were mixed, and subjected to ball milling with alcohol (having a volume concentration of 72 vol %) as a ball milling medium, where the ball milling was conducted by using zirconium oxide grinding balls as a grinding ball at 650 rpm for 19 h to obtain a surface modifier-coated ceramic powder (a surface modifier coating layer had a thickness of 2.3 nm).

A ceramic internal mixer was preheated until a temperature of a cone reached 180° C., 2,386 g of the surface modifier-coated ceramic powder was added to the mixer, and then 644.22 g of a binder system (including high-strength HDPE, high-toughness LDPE, PEG, and maleic anhydride-grafted POE at a mass ratio of 16:18:58:6, where the PEG was a compound of PEG800 and PEG2000 at a mass ratio of 4:1) was added thereto. After the surface modifier-coated ceramic powder and the binder system were completely melted together, 2,386 g of the surface modifier-coated ceramic powder was added thereto, and a resulting mixed material was crushed to obtain a ceramic 3D printing feed.

3D printing was conducted by a 3D printing screw extrusion printer (an extrusion pressure was 40 MPa, and temperatures from a screw feed port to a nozzle were 160° C., 170° C., 180° C., and 190° C. in sequence), followed by water solvent debinding (which was conducted at 55° C. for 3.6 d) and then reaction sintering (which was conducted at 2,180° C. for 4 h under a vacuum degree of 7.5 Pa) to obtain a large-size silicon carbide mirror for space use.

Example 4

350 g of graphite, 95 g of carbon black, 5,000 g of silicon carbide (purity ≥99.5%), and 108.9 g of a surface modifier (the type was specifically silane coupling agent) were mixed, and subjected to ball milling with alcohol (having a volume concentration of 70 vol %) as a ball milling medium, where the ball milling was conducted by using zirconium oxide grinding balls as a grinding ball at 700 rpm for 22 h to obtain a surface modifier-coated ceramic powder (a surface modifier coating layer had a thickness of 1.9 nm).

A ceramic internal mixer was preheated until a temperature of a cone reached 180° C., 2,776.95 g of the surface modifier-coated ceramic powder was added to the mixer, and then 833 g of a binder system (including high-strength HDPE, high-toughness LDPE, PEG, and maleic anhydride-grafted POE at a mass ratio of 20:20:53:7, where the PEG was a compound of PEG800 and PEG6000 at a mass ratio of 3:1) was added thereto. After the surface modifier-coated ceramic powder and the binder system were completely melted together, 2,776.95 g of the surface modifier-coated ceramic powder was added thereto, and a resulting mixed material was granulated to obtain a ceramic 3D printing feed.

3D printing was conducted by a 3D printing screw extrusion printer (an extrusion pressure was 35 MPa, and temperatures from a screw feed port to a nozzle were 160° C., 170° C., 180° C., and 190° C. in sequence), followed by water solvent debinding (which was conducted at 50° C. for 4 d) and then reaction sintering (which was conducted at 2,200° C. for 3.5 h under a vacuum degree of 6 Pa) to obtain a silicon carbide boat for photovoltaic use.

Test Example

Test item: Purity test of the reaction sintered photovoltaic boat prepared by this method (Third-party testing agency: Shanghai WEIPU Testing Technology Group Co., Ltd.). Test process: GDMS was used to test the content of various impurities such as metals in the sample. Test results: Only the relative contents of Fe, Al, and B exceeded 100 ppm, where a relative content of Fe was 290 ppm, a relative content of Al was 220 ppm, and a relative content of B was 330 ppm. Conclusion: The measured impurity contents of the sample were extremely low, which could meet the application of the product in the photovoltaic industry.

Test item: Density test of the reaction sintered silicon carbide ceramic impeller (using a density meter based on the Archimedes drainage method). Test process: 12 small fragments of a crushed silicon carbide impeller were randomly sampled for the density test. Test results: The density after the test was 2.956±0.45 g/cm$^3$, and the test performance met the requirements of the silicon carbide ceramic impeller under actual working conditions.

Test item: Strength test of the sample strips printed by this method. Test process: The bending strength of 12 sample strips was tested by a three-point bending test using a universal testing machine. Test result: The result of the strength test was 395 MPa±32 MPa, which met the mechanical property requirements of silicon carbide as a structural ceramic.

The above descriptions are merely the preferred embodiments of the present disclosure. It should be noted that a person of ordinary skill in the art may further make several improvements and modifications without departing from the principle of the present disclosure, but such improvements and modifications should be deemed as falling within the scope of the present disclosure.

What is claimed is:

1. A method for manufacturing a silicon carbide ceramic part by plastic fused deposition modeling (FDM)-3D printing based on water debinding, comprising:
   mixing graphite, carbon black, silicon carbide, and a surface modifier, and subjecting a resulting mixture to modification to obtain a surface modifier-coated composite ceramic powder;
   subjecting the surface modifier-coated composite ceramic powder, a macromolecular binder and a water-soluble binder to internal mixing, and then subjecting a resulting mixed material to crushing or granulation to obtain a ceramic 3D printing feed, wherein the macromolecular binder comprises a high-strength engineering plastic, a high-toughness engineering plastic, and a thermoplastic elastomer, and the water-soluble binder comprises a polyethylene glycol (PEG); the high-strength engineering plastic has a bending strength greater than or equal to 50 MPa, the high-toughness engineering plastic has a fracture toughness greater than or equal to 50 MPa·m$^{1/2}$, and the PEG comprises a high-molecular-weight PEG and a low-molecular-weight PEG; and the low-molecular-weight PEG has a weight-average molecular weight less than or equal to 1,000, and the high-molecular-weight PEG has a weight-average molecular weight greater than 1,000; and subjecting the ceramic 3D printing feed to FDM-3D printing, water debinding, and reaction sintering in sequence to obtain the silicon carbide ceramic part.

2. The method of claim 1, wherein a mass ratio of the graphite, the carbon black, and the silicon carbide is in a range of (5-7):(1-2): 100.

3. The method of claim 1, wherein the surface modifier comprises one or more selected from the group consisting of a fatty acid surface modifier, and a coupling agent surface modifier; the fatty acid surface modifier comprises one or more selected from the group consisting of stearic acid, oleic acid, and dodecyl stearic acid; and the coupling agent surface modifier comprises one or more selected from the group consisting of a silane coupling agent, a titanate coupling agent, and an aluminate coupling agent; and a ratio of a mass of the surface modifier to a total mass of the graphite, the carbon black, and the silicon carbide is in a range of 0.5:100 to 3:100.

4. The method of claim 1, wherein the modification is conducted under a condition of ball milling, and the ball milling is conducted by wet ball milling; and the ball milling is conducted at a rotate speed of 500 rpm to 700 rpm with alcohol as a medium under a ball-to-material mass ratio of 2:1 to 3:1 for 12 h to 24 h, and the ball milling is conducted by using a zirconium oxide microbead as a grinding ball.

5. The method of claim 1, wherein a ratio of a mass of the surface modifier-coated composite ceramic powder to a total mass of the macromolecular binder and the water-soluble binder is in a range of 4.6:1 to 8:1; and a mass ratio of the high-strength engineering plastic, the high-toughness engineering plastic, the PEG, and the thermoplastic elastomer is in a range of (15-20):(15-20):(50-60):(5-10).

6. The method of claim 1, wherein the high-molecular-weight PEG comprises one or more selected from the group consisting of PEG2000 and PEG6000; and the low-molecular-weight PEG comprises one or more selected from the group consisting of PEG500 and PEG800; and a mass ratio of the low-molecular-weight PEG to the high-molecular-weight PEG is in a range of 1:1 to 4:1.

7. The method of claim 1, wherein the internal mixing is conducted in an internal mixer at a temperature of 170° C. to 190° C. for 1 h to 2 h.

8. The method of claim 1, wherein the FDM-3D printing is conducted by a precision screw extrusion FDM printer; and the FDM-3D printing is conducted under the following conditions: an extrusion pressure being 10 MPa to 40 MPa, and temperatures from a feed port to a nozzle of the screw extrusion FDM printer being 160° C., 170° C., 180° C., and 190° C. in sequence.

9. The method of claim 1, wherein the water debinding is conducted at a temperature of 40° C. to 60° C. for 72 h to 120 h.

10. The method of claim 1, wherein the reaction sintering is conducted at a temperature of 2,100° C. to 2,250° C. under a vacuum degree less than or equal to 10 Pa, and the reaction sintering is held at the temperature for 3 h to 7 h.

11. The method of claim 5, wherein the high-molecular-weight PEG comprises one or more selected from the group consisting of PEG2000 and PEG6000; and the low-molecular-weight PEG comprises one or more selected from the group consisting of PEG500 and PEG800; and a mass ratio of the low-molecular-weight PEG to the high-molecular-weight PEG is in a range of 1:1 to 4:1.

12. The method of claim 5, wherein the internal mixing is conducted in an internal mixer at a temperature of 170° C. to 190° C. for 1 h to 2 h.

* * * * *